(12) United States Patent
Dams et al.

(10) Patent No.: US 8,922,197 B2
(45) Date of Patent: Dec. 30, 2014

(54) SPEED SENSOR

(75) Inventors: Johannes Adrianus Antonius Theodorus Dams, Veldhoven (NL); Lambertus Gerardus Cornelis Van Den Broek, Veldhoven (NL)

(73) Assignee: Magnetic Innovations, B.V. (NL)

( * ) Notice: Subject to any disclaimer, the term of this patent is extended or adjusted under 35 U.S.C. 154(b) by 843 days.

(21) Appl. No.: 12/739,726

(22) PCT Filed: Oct. 24, 2008

(86) PCT No.: PCT/NL2008/050671
§ 371 (c)(1),
(2), (4) Date: Jun. 6, 2011

(87) PCT Pub. No.: WO2009/054724
PCT Pub. Date: Apr. 30, 2009

(65) Prior Publication Data
US 2011/0259102 A1    Oct. 27, 2011

(30) Foreign Application Priority Data
Oct. 24, 2007 (NL) .................................... 2000959
May 28, 2008 (NL) .................................... 2001627

(51) Int. Cl.
*G01P 3/48* (2006.01)
*G01V 1/18* (2006.01)

(52) U.S. Cl.
CPC .................................... *G01V 1/181* (2013.01)
USPC ............................................................ 324/174

(58) Field of Classification Search
USPC ........................................................ 324/174
See application file for complete search history.

(56) References Cited

U.S. PATENT DOCUMENTS

| 5,896,076 | A | * | 4/1999 | van Namen | 335/229 |
| 6,039,014 | A | * | 3/2000 | Hoppie | 123/90.11 |
| 7,075,290 | B2 | * | 7/2006 | Collier-Hallman et al. | 324/163 |
| 2005/0094118 | A1 | * | 5/2005 | Dams | 355/53 |
| 2008/0204174 | A1 | * | 8/2008 | Ito et al. | 335/222 |
| 2011/0057755 | A1 | * | 3/2011 | Dams | 335/289 |

* cited by examiner

*Primary Examiner* — Reena Aurora
(74) *Attorney, Agent, or Firm* — Eric Karich

(57) ABSTRACT

A speed sensor has a static part and a dynamic part arranged concentrically inside the static part. The static part has two permanent magnets and the dynamic part has two further permanent magnets. The magnet is oriented reversely to the further magnets. The magnets are tuned to each other so that gravity on the dynamic part is counteracted by the magnetic force on the dynamic part. As a result, the weight of the dynamic part need not be carried by springs and the dynamic part can move freely so that the full stroke can be used for measuring accelerations and the natural frequency is low. The static part further includes a measuring coil for measuring the displacement of the dynamic part and for the radial positioning of the dynamic part this part is connected to the static part by means of leaf springs.

22 Claims, 5 Drawing Sheets

SPEED SENSOR

FIELD OF THE INVENTION

The invention relates to a speed sensor comprising a first part and a second part arranged concentrically around the first part, the first and second parts being axially movable relative to each other. One of the parts is static and the other part is dynamic, and one of the parts comprises a measuring coil for measuring the speed at which the two parts are displaced relative to each other. The first part comprises a first magnet array and the second part a second magnet array, which magnet arrays exert a magnetic force on each other. In this context a static part is to be understood to mean the part that is connected to the object or the environment of which vibrations or accelerations or other parameters are to be measured. In practice this 'static part' will move and the 'dynamic part' will be stationary.

Sensors of this type are used, inter alia, for measuring seismologic activity, as well as for measuring mechanical vibrations, acoustic waves or infrasound waves. To this end the static part may be connected to the ground. When measuring vibrations in the earth's crust, the static part will be displaced relative to the dynamic part, which relative displacement is then measured.

STATE OF THE ART

A speed sensor of this type is known from GB-A-2366474. In this known speed sensor the first part is static and the second part is formed by a coil which is concentrically arranged inside the first part and is connected to the first part by means of leaf springs. The weight of the coil is then carried by the leaf springs, which are already partly sagged in initial position. This sagging of the leaf springs provides that the material stresses in the leaf spring have already slightly increased as a result of which a possible maximum working stroke (confined by a maximum permissible material-dependent stress) is reduced. Also because of this fact such sensors have a problem reaching a low natural frequency. The moving of the coil additionally produces problems as regards realization of a robust electrical connection between the moving coil and the measuring system.

SUMMARY OF THE INVENTION

It is an object of the invention to provide a speed sensor of the type defined in the opening paragraph in which the disadvantages described above of the known speed sensor are not found or occur at least in fewer instances. For this purpose the speed sensor according to the invention is characterized in that the two magnet arrays are such that the weight of the dynamic part is opposite in direction and equal in size to the magnetic force experienced by this part. The magnet arrays are then tuned to each other in such a way that gravity on the dynamic part is substantially completely counterbalanced by the magnetic force on the dynamic part. If need be additional mass is added to the dynamic part, which mass is tuned to the actual bias force. As a result the weight of the dynamic part need not be carried by springs and can move freely, so that the complete stroke (limited by the material stresses in the leaf springs) can be used for measuring. The bias force, which is generated by the magnets, changes only slightly when the dynamic magnets are displaced relative to the static magnets. As a result, the magnet system (comprising the first and second magnet arrays) has low rigidity. The variation of the magnetic bias force (magnetic rigidity) of the system used is so low that, combined with the mass of the dynamic part (including possibly added mass), it provides a very low natural frequency. Furthermore, it is avoided that (because of the fact that the moving mass is largely carried by magnetic fields having very low rigidity) in the case of a very slack leaf spring (to achieve the same natural frequency) the static sagging and attendant material stress would become too large.

The first magnet array preferably comprises at least one permanent magnet and the second magnet array at least one further permanent magnet, the polarization of the at least one permanent magnet being in essence opposite to that of the at least one further permanent magnet or in essence perpendicular to it.

An embodiment of the speed sensor according to the invention is characterized in that the further magnet is a radially magnetized, annular permanent magnet.

Another embodiment of the speed sensor according to the invention is characterized in that the second magnet array comprises a second further permanent magnet, the further magnets being arranged in axial direction behind one another and one of the further magnets having a different orientation from that of the two other magnets.

A further embodiment of the speed sensor according to the invention is characterized in that the first magnet array comprises two permanent magnets which the magnet mentioned earlier forms part of, which magnets are spaced apart in axial direction and of which four magnets one magnet has an orientation that is different from that of the other three. The magnets may then be manufactured in a simple manner from one block so that a minimum spread in material properties is obtained.

The first part is preferably static and the second part is preferably dynamic, the dynamic part being present inside the static part and the measuring coil forming a component part of the static part.

A still further embodiment of the speed sensor according to the invention is characterized in that between the two parts at least one coil or electric conductor connected to the static part is present in the magnetic field. This coil is preferably short-circuited by an electric resistor and provides a certain degree of damping of the dynamic part with respect to the static part. Depending on the desired degree of damping there are one or more short-circuited coils or electric conductors present. Alternatively a capacitor may be connected to the coil(s) or electric conductor(s) to provide a frequency-dependent damping.

Again a further embodiment of the speed sensor according to the invention is characterized in that the second magnet array further includes a third further magnet, the middle one of the further magnets having a different orientation from that of the two outer further magnets. Also in this case the first magnet array preferably comprises three magnets. As a result, the required vertical bias force can substantially completely be reduced to zero and thus be precisely tuned to the moving mass of the dynamic part.

Still again a further embodiment of the speed sensor according to the invention is characterized in that the second magnet array further includes a fourth further magnet, the two middle ones of the further magnets having a different orientation from that of the two outer further magnets. The direction of the magnetic field of the two upper further magnets of the dynamic part is here opposite to that of the two lower further magnets as a result of which the magnetic bias force is opposite and is eliminated. Here too the required vertical bias force can substantially completely be reduced to zero and thus be precisely tuned to the moving mass of the dynamic part and in this case the magnet array preferably comprises four magnets.

The distance between two magnets arranged behind one another in axial direction is preferably adjustable. This renders it possible to set the magnetic force so that inter alia the effect of temperature change can be counterbalanced.

In order to counterbalance the magnetic force as a result of the change in temperature of the magnets, preferably the materials from which one or both magnet arrays are made are matched in such a way that in the case of expansion/shrinking of the magnet arrays owing to change in temperature the axial distance between the magnets and thus the magnetic force changes to such extent that it fully or partially counterbalances the change of the magnetic force resulting from the change in temperature of the magnets. A mechanical readjustment of the vertical distance between the magnets in the form of thread or shims is alternatively possible.

In order to measure not only speeds but also displacements of the parts relative to each other, preferably in axial direction a first capacitor plate is affixed to one end of the dynamic part and a second capacitor plate, which is connected to the static part, is arranged at a slight distance from and parallel with this first capacitor plate.

A further embodiment of the speed sensor according to the invention is characterized in that the second part is connected to the first part by means of one or more leaf springs, which leaf spring/leaf springs is/are relatively rigid in radial direction and relatively slack in axial direction, the magnetic field having a negative rigidity which completely or partially cancels out the positive axial rigidity of the leaf spring/leaf springs, and the sum of the rigidities provides a low natural frequency of the moving mass. The leaf spring or leaf springs serve to maintain the dynamic part in the middle radially.

A still further embodiment of the speed sensor according to the invention is characterized in that the dynamic part is suspended from the static part in a reciprocating manner. As a result, a possible tilt of the static part does not have any or has hardly any influence on the operation of the speed sensor. The dynamic part is connected to the static part preferably by means of a leaf spring. In axial direction the leaf spring is preferably connected in or near the centre to the dynamic part.

In this embodiment preferably at least three coils are present between the static part and the dynamic part, the axial shafts of the coils being in essence perpendicular to the axial shafts of the parts and being spread over a circle. These coils can be instrumental in determining the tilt of the static part relative to the dynamic part.

Yet a further embodiment of the speed sensor according to the invention is characterized in that the dynamic part is connected to a leaf spring at two spots in essence across from each other, which leaf spring is rigid in a direction parallel with the axial shaft of the dynamic part and slack in a direction perpendicular to the axial shaft and directed towards the axial shaft of the dynamic part. With this embodiment, horizontal speeds can be measured. Between the static and the dynamic part there are preferably two coils arranged at two spots which are in essence located across from each other, the axial shafts of which coils being perpendicular to the axial shafts of the parts. With these coils it is possible to measure the speed in horizontal direction.

It should be observed that the speed sensor according to the invention can also be used for suppressing/damping vibrations of for example a machine element. To this end the speed sensor is to be affixed to the machine element concerned. If the frequency of the vibrations exceeds the natural frequency of the speed sensor, there will be a difference in speed between the static part of the speed sensor connected to the machine element and the dynamic part of the speed sensor. By short-circuiting the measuring coil by means of a resistor or capacitor and possibly other short-circuited electrical conductors in the speed sensor, the vibration will be partially damped by the speed sensor. The speed sensor may also be included in a control system where the vibration is measured and transmitted to a controller which drives the speed sensor by exciting the measuring coils, so that the dynamic part starts making vibrations that are opposite to the vibrations of the machine element and thus suppresses/damps these vibrations. To this end the mass of the dynamic part is desired to be large.

BRIEF DESCRIPTION OF THE DRAWINGS

The invention will now be described in more detail based on examples of embodiment of the speed sensor according to the invention while reference is made to the appended drawing figures, in which.

DETAILED DESCRIPTION OF THE DRAWINGS

Figure 1:
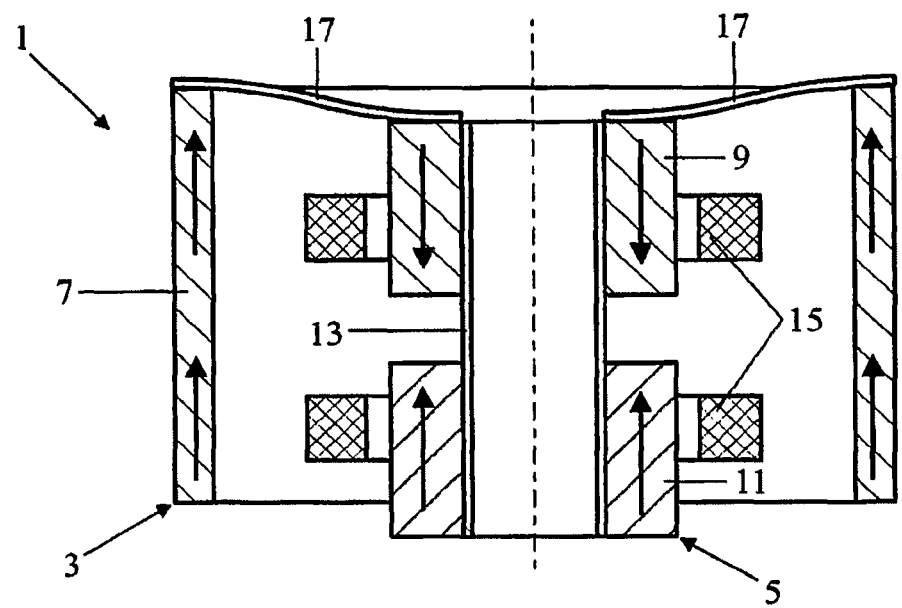
FIG. 1 shows a sectional view of a first embodiment of the speed sensor according to the invention comprising three magnets.
Figure 2:
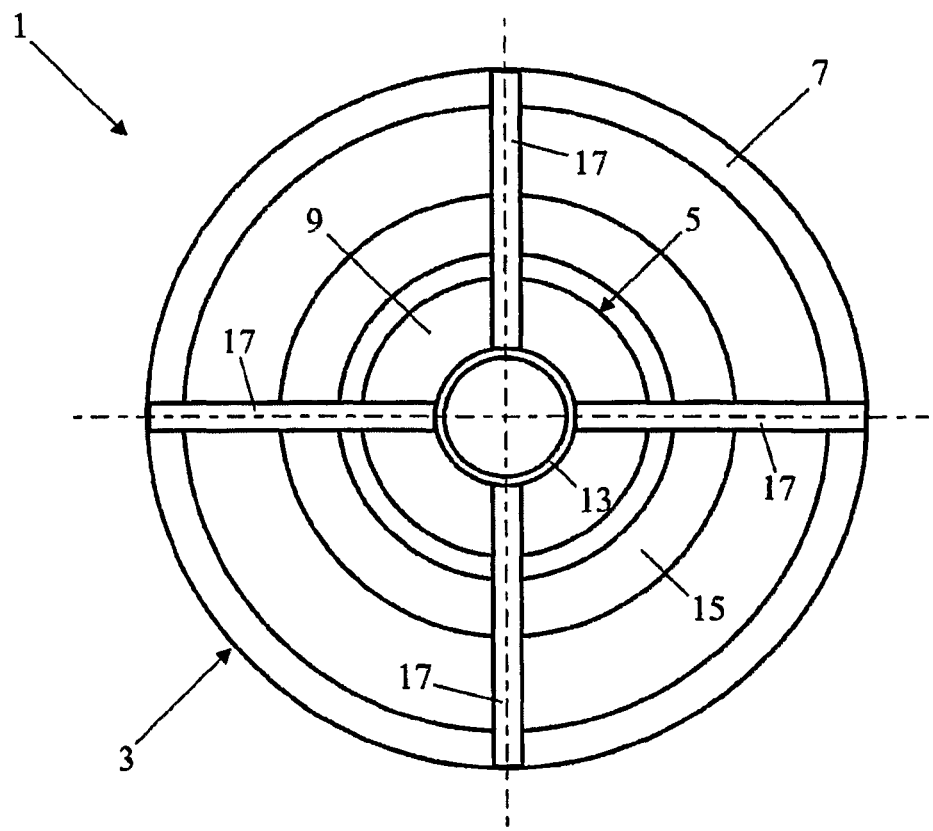
FIG. 2 shows a plan view of the speed sensor shown in FIG. 1.

FIGS. 1 and 2 show a sectional view and plan view respectively of the magnet system of a first embodiment of the speed sensor according to the invention. The housing and further elements of the speed sensor are omitted in these and further drawing Figures. The speed sensor 1 comprises a static, first part 3 and a dynamic, second part 5 concentrically arranged therein. These two parts 3 and 5 are axially moveable relative to each other.

The static part 3 comprises a magnet array of a permanent magnet 7 where the magnetic flux and thus the North-South orientation through the magnet is indicated by arrows. The dynamic part 5 comprises a magnet array of two further permanent magnets 9 and 11 which are affixed to a cylindrical carrier 13 and are spaced apart in axial direction. The further magnet 9 has an opposite orientation to that of the other magnets 7 and 11.

The static part 3 comprises two measuring coils 15 for measuring the speed at which the two parts move relative to each other. The two measuring coils are connected in series and have the same direction of winding and preferably an equal number of windings. A speed-dependent measuring signal with a slight distortion of the signal over the entire stroke of the moving part can be realized by optimizing the measurements of the measuring coils. Furthermore, the static part 3 may comprise a correction coil (not shown in the drawing Figures). A current may also be passed through this correction coil so as to generate an additional force for compensation of any effects of temperature on the magnetic bias force.

The dynamic part 5 is connected to the static part 3 by means of leaf springs 17 (connected both to the upper side and the lower side of part 5 if need be). These leaf springs 17 are used for radial positioning of the dynamic part relative to the static part. For this purpose the leaf springs are rigid in radial direction and slack in axial direction for the benefit of a low natural frequency. The leaf springs 17 will have a slight axial rigidity, but as a result of this nevertheless cause a change of axial force between the two parts to occur when the dynamic part is displaced relative to the static part. In the case where the speed sensor 1 has a negative magnetic rigidity, this undesired axial rigidity of the leaf springs is completely or partially counterbalanced.

The construction of the speed sensor 1 according to the invention is very robust because only the magnets 9 and 11 are moving and there is no necessity for electric leads to be connected to the dynamic part 5. The use of the two oppositely directed axial magnets 9 and 11, which generate a more or less radial magnetic field in the space between the two magnets, provides that radially magnetized rings may be omitted so that cost of manufacturing is reduced. In addition, as a result of the radial play between the part 5 and the measuring coils 15 any radial stroke is not immediately mechanically limited.

Figure 3:
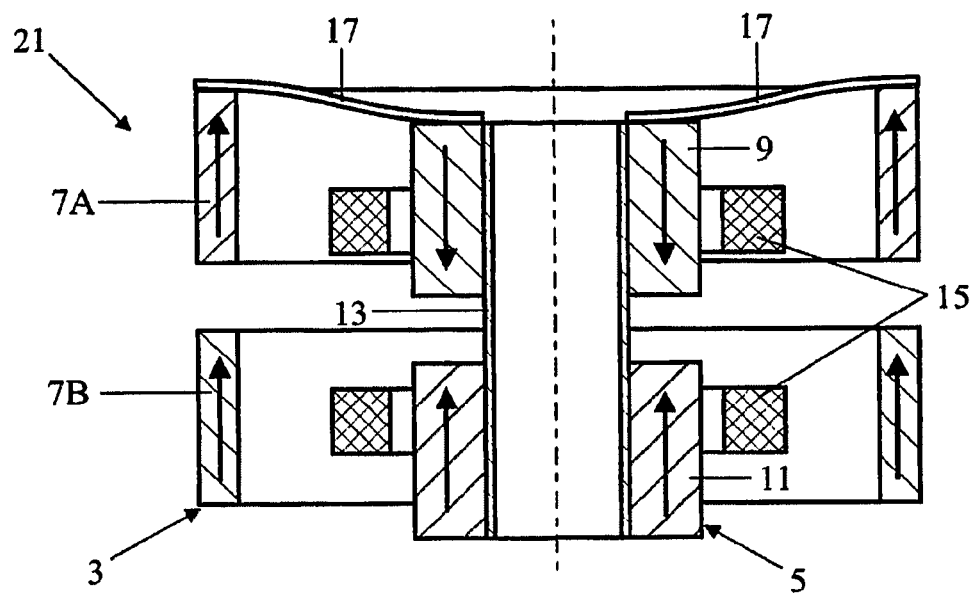
FIG. 3 shows a sectional view of a second embodiment of the speed sensor according to the invention comprising four magnets.

FIG. 3 shows a sectional view of a second embodiment of the speed sensor according to the invention. Any elements which are equal to those of the first embodiment are referred to here by the same reference numerals. In this speed sensor 21 the magnet array of the static part 3 includes two permanent magnets 7A and 7B which are spaced apart in axial direction. By varying the distance between the magnets 7A and 7B and/or the distance between the magnets 9 and 11, the magnetic force can be adjusted. A limited variation in magnetic bias force by a change of the distance between magnets 9 and 11 and/or 7A and 7B will also yield not more than a slight change in the rigidity characteristic of the speed sensor.

Figure 4:
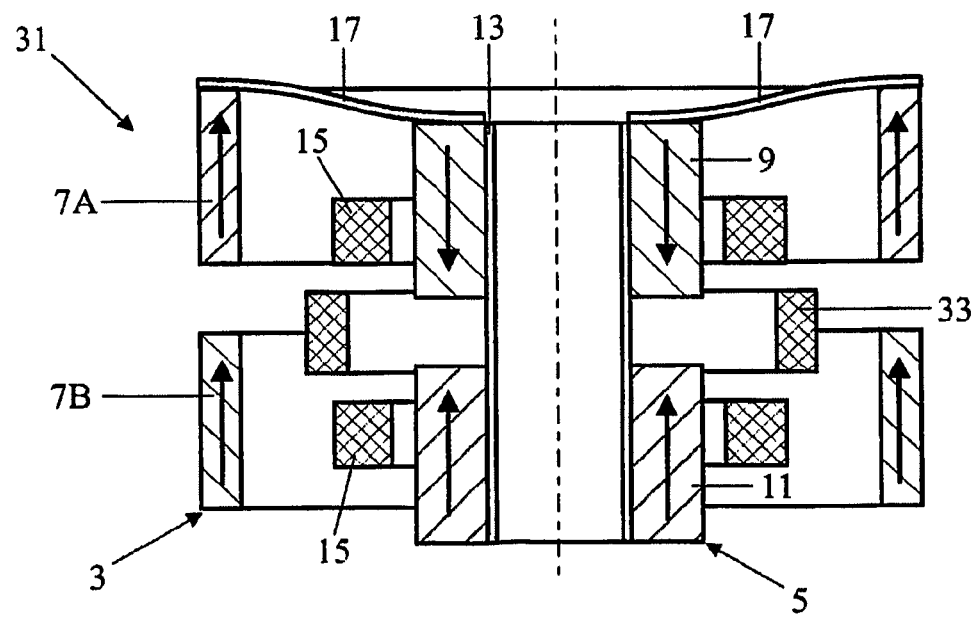
FIG. 4 shows a sectional view of a third embodiment of the speed sensor according to the invention including coils for damping of the dynamic part.

FIG. 4 shows a sectional view of the third embodiment of the speed sensor according to the invention. Any elements which are equal to those of the first embodiment are referred to here by the same reference numerals. In this speed sensor 31 the static part 3 includes a short-circuited coil 33. This coil 33 provides damping of the dynamic part 5 relative to the static part 3.

Figure 5:
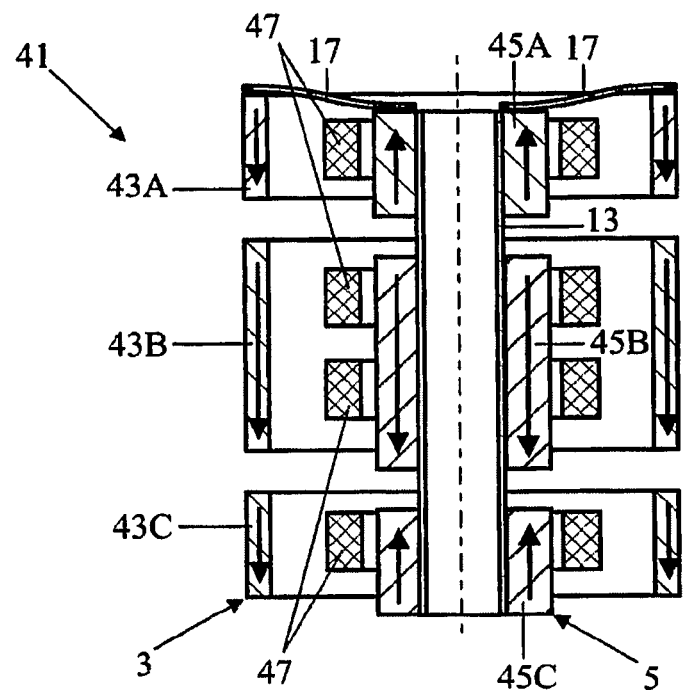
FIG. 5 shows a sectional view of a fourth embodiment of the speed sensor according to the invention comprising six magnets.

FIG. 5 shows a sectional view of a fourth embodiment of the speed sensor according to the invention. Any elements which are equal to those of the first embodiment are referred to here by the same reference numerals. This speed sensor 41 comprises six magnets, three static magnets 43A to 43C and three dynamic magnets 45A to 45C. They can be used for reducing the required bias force to substantially zero and thus tuning this bias force exactly to the moving mass of the dynamic part. Furthermore, the speed sensor 41 includes four measuring coils 47. All four measuring coils are connected in series and preferably have an equal number of windings, the upper two coils having a direction of winding that is opposite to that of the lower two coils. Alternatively it is possible to omit or short-circuit the two middle coils or the two outer coils by means of a resistor, or replacing them with an electrical conductor and thus provide a certain degree of damping of the dynamic part relative to the static part. Depending on the desired degree of damping there are one or more short-circuited coils or electrical conductors present. It is also possible for a capacitor to be connected to the coil(s) or electrical conductor(s) so as to realize a frequency-dependent damping.

Figure 6:
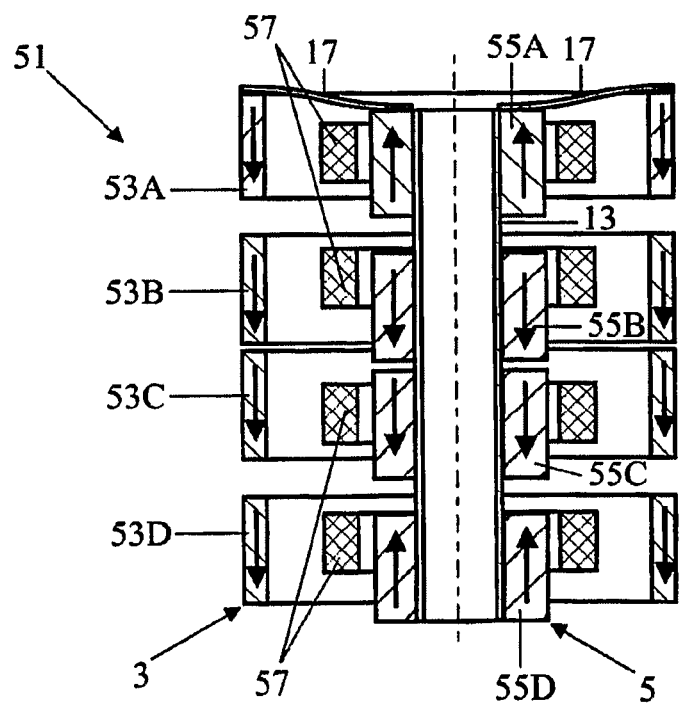
FIG. 6 shows a sectional view of a fifth embodiment of the speed sensor according to the invention comprising eight magnets.

FIG. 6 shows a sectional view of a fifth embodiment of the speed sensor according to the invention. Any elements which are equal to those of the first embodiment are referred to here by the same reference numerals. This speed sensor 51 comprises eight magnets, four static magnets 53A to 53D and four dynamic magnets 55A to 55D. Here too there are four measuring coils 57 present. The magnet system of this speed sensor 51 is a double embodiment of the magnet system of the speed sensor shown in FIG. 3. The direction of the magnetic field of the upper two dynamic magnets, however, is opposite to that of the lower two dynamic magnets, so that the magnetic bias force is the reverse and is canceled. A more limited magnetic bias force can now again be generated by changing the distance between the magnets 53A to 53D and 55A to 55D, which, however, results in only a very small change in the rigidity characteristic of the speed sensor.

Figure 7:
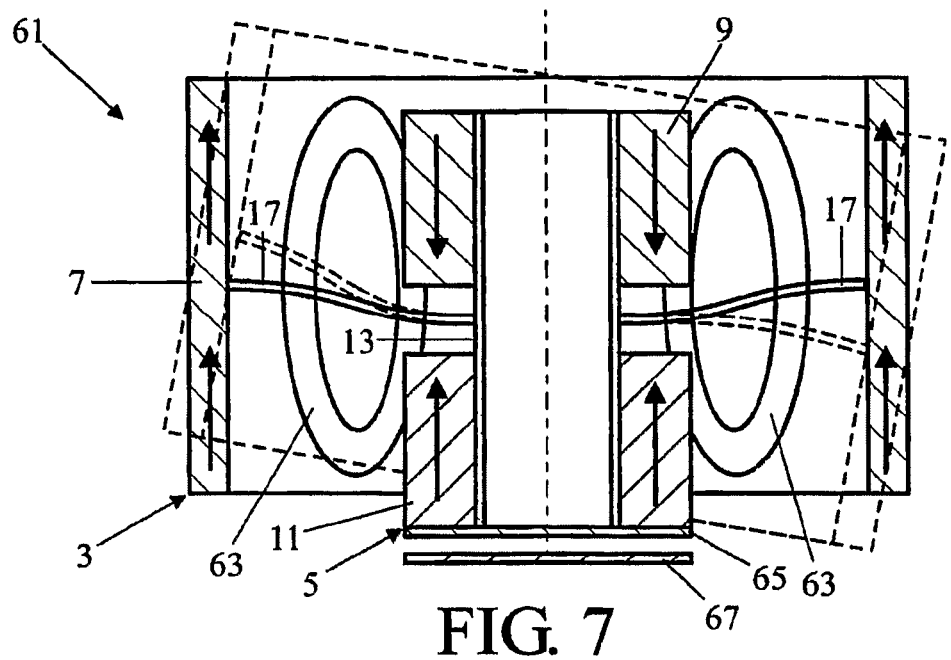
FIG. 7 shows a sectional view of a sixth embodiment of the speed sensor according to the invention comprising a reciprocating dynamic part.
Figure 8:
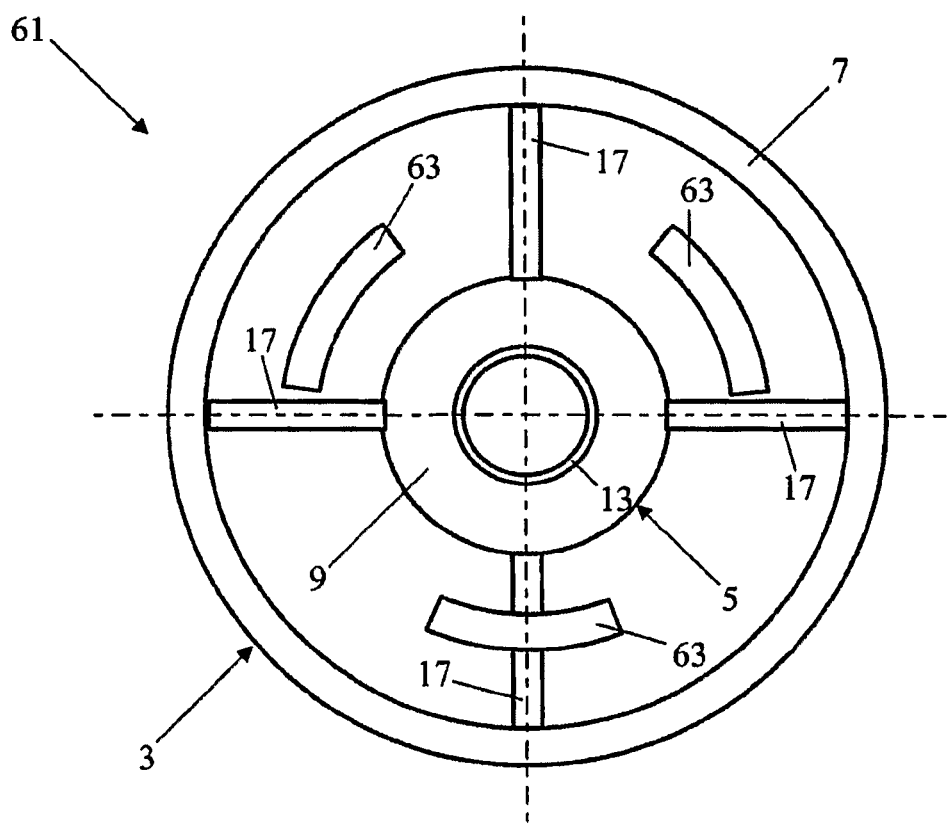
FIG. 8 shows a plan view of the speed sensor shown in FIG. 7.

FIGS. 7 and 8 show a sectional view and plan view respectively of a sixth embodiment of the speed sensor according to the invention. Any elements which are equal to those of the first embodiment are referred to here by the same reference numerals. In this speed sensor 61 the dynamic part 5 is suspended in a reciprocating way from the static part 3 in that the dynamic part 5 is connected in the middle by means of a connection of the axially slack and radially rigid leaf spring 17 to the static part 3.

Between the static part and the dynamic part there are three coils 63 spread over a circle. The axial shafts of these coils are perpendicular to the axial shafts of the parts. In plan view (FIG. 8) the coils 63 have a crescent shape. To one end of the dynamic part 5 is affixed a first capacitor plate 65 and at a slight distance from and parallel to this first capacitor plate there is a second capacitor plate 67 which is connected to the static part 3. Herewith it is possible to measure not only the speed but also the displacement of the parts 3 and 5 relative to each other.

Figure 9:
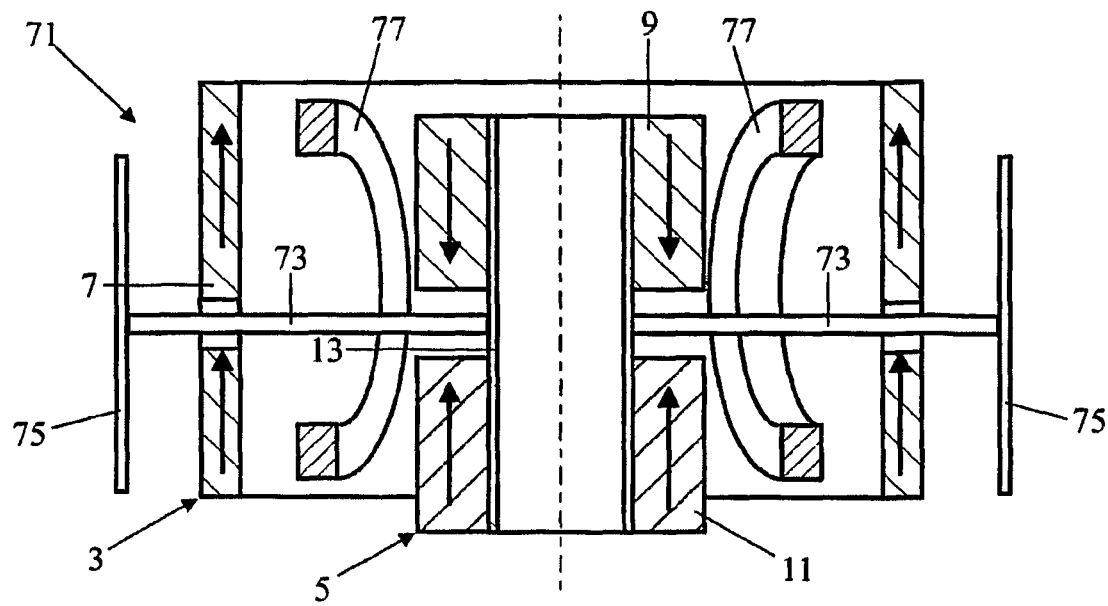
FIG. 9 shows a sectional view of a seventh embodiment of the speed sensor according to the invention comprising a horizontally displaceable part.
Figure 10:
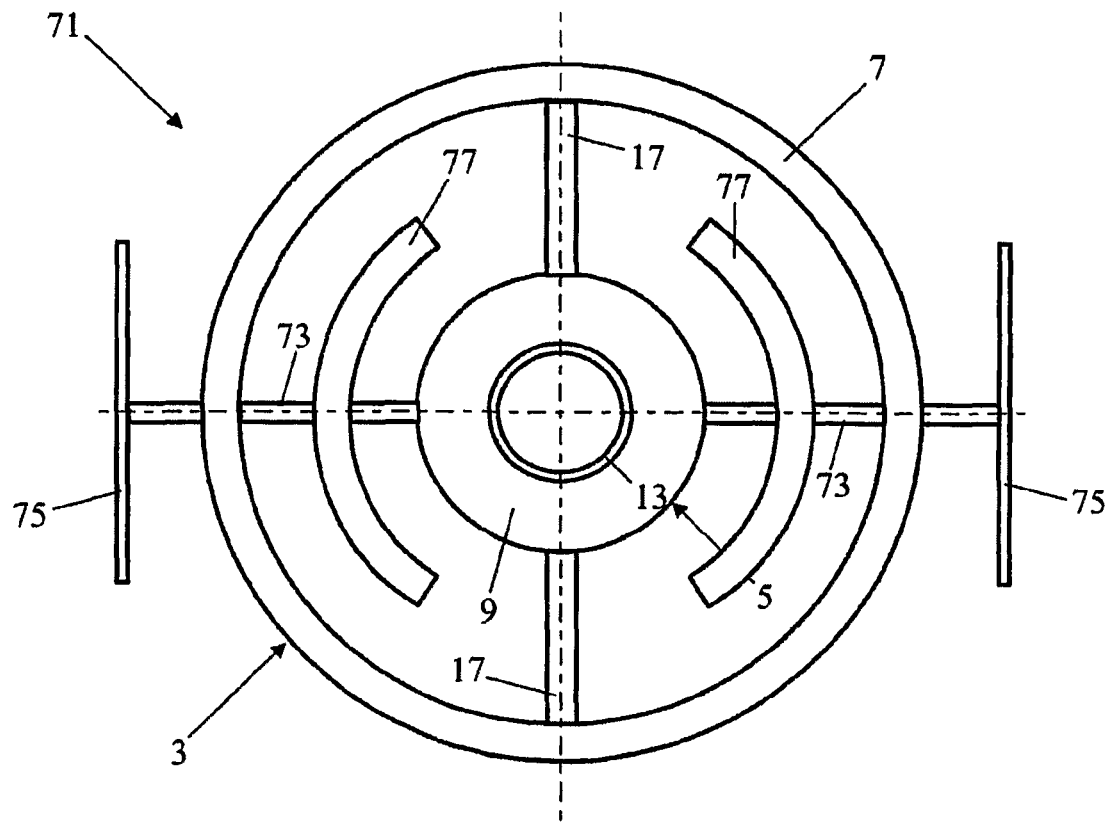
FIG. 10 shows a plan view of the speed sensor shown in FIG. 9.

FIGS. 9 and 10 show the magnet system of a seventh embodiment of the speed sensor according to the invention in sectional view and in plan view respectively. Here too any elements which are equal to those of the first embodiment are referred to by the same reference numerals. In this speed sensor 71 the dynamic part is displaceble in horizontal direction. To this end the dynamic part 5 is connected by means of shafts 73 to leaf springs at two spots across from each other, which leaf springs are rigid in a direction parallel with the axial shaft of the dynamic part and slack in a direction perpendicular to the axial shaft and directed towards the axial shaft of the dynamic part.

Between the static part and the dynamic part there are two coils 77 which are present at two spots across from each other and of which the axial shaft is perpendicular to the axial shafts of the parts 3 and 5.

Albeit the invention has been described in the foregoing with reference to the drawing Figures, it should be pointed out that the invention is not by any manner or means restricted to the embodiments shown in the drawings. The invention also extends over any embodiment deviating from the embodiments shown in the drawing Figures within the spirit and scope defined by the claims. For example, the outer and inner magnets may also be interchanged as a result of which other configurations of the magnet system evolve. Furthermore, instead of a leaf spring also an air bearing plus an additional coil (or the measuring coil already present) with a control circuit may be used for the generation of a force to maintain the dynamic part in the middle of the static part, to avoid the dynamic part going out-of-centre owing to temperature effects or tilting of the speed sensor.

What is claimed is:

1. A speed sensor comprising:
a first part and a second part arranged concentrically around it, which parts are axially movable relative to each other, one of the parts being static and the other part being dynamic and one of the parts comprising a measuring coil for measuring the speed at which the two parts are displaced relative to each other and the first part comprising a first magnet array and the second part a second magnet array, which magnet arrays exert a magnetic force on each other, characterized in that the two magnet arrays are such that a gravity force on the dynamic part is opposite in direction and equal in size and is completely counterbalanced by a resultant force exerted on the dynamic part as a result of magnetic attractive forces between the two magnet arrays.

2. A speed sensor as claimed in claim 1, characterized in that the first magnet array comprises at least one permanent magnet and the second magnet array at least one further permanent magnet, the polarization of the at least one permanent magnet being in essence opposite to that of the at least one further permanent magnet or in essence perpendicular to it.

3. A speed sensor as claimed in claim 2, characterized in that the further magnet is a radially magnetized, annular permanent magnet.

4. A speed sensor as claimed in claim 2, characterized in that the second magnet array comprises a second further permanent magnet, the further magnets being arranged in axial direction behind one another and one of the further magnets having an orientation that is different from that of the two other magnets.

5. A speed sensor as claimed in claim 4, characterized in that the first magnet array comprises two permanent magnets which the magnet mentioned earlier forms part of, which magnets are spaced apart in axial direction and of which four magnets one magnet has a different orientation from that of the other three.

6. A speed sensor as claimed in claim 4, characterized in that the first part is a static part and the second part is a dynamic part, where the dynamic part is present inside the static part and the measuring coil forms a component part of the static part.

7. A speed sensor as claimed in claim 4 characterized in that between the two parts at least one coil or electric conductor connected to the static part is present in the magnetic field.

8. A speed sensor as claimed in claim 7, characterized in that the coil or electric conductor is connected to a capacitor.

9. A speed sensor as claimed in claim 4, characterized in that the second magnet array further includes a third further magnet, the middle one of the further magnets having a different orientation from that of the two outer further magnets.

10. A speed sensor as claimed in claim 9, characterized in that also the first magnet array comprises three magnets.

11. A speed sensor as claimed in claim 9, characterized in that the second magnet array further includes a fourth further magnet, the two middle ones of the further magnets having a different orientation from that of the two outer further magnets.

12. A speed sensor as claimed in claim 11, characterized in that also the first magnet array comprises four magnets.

13. A speed sensor as claimed in claim 4, characterized in that the distance between two magnets arranged behind one another in axial direction is adjustable.

14. A speed sensor as claimed in claim 4, characterized in that the materials from which one or both magnet arrays are made are matched in such a way that in the case of expansion/shrinking of the magnet arrays owing to change in temperature the axial distance between the magnets and thus the magnetic force changes to such extent that it counterbalances the change of the magnetic force resulting from the change in temperature of the magnets.

15. A speed sensor as claimed in claim 1, characterized in that in axial direction a first capacitor plate is affixed to one end of the dynamic part and in axial direction a second capacitor plate connected to the static part is arranged at a slight distance from and parallel with this first capacitor plate.

16. A speed sensor as claimed in claim 1, characterized in that the second part is connected to the first part by means of one or more leaf springs, which leaf spring/leaf springs is/are relatively rigid in radial direction and relatively slack in axial direction, while the magnetic field has a negative rigidity which completely or partially cancels out the positive axial rigidity of the leaf spring/leaf springs, and the sum of the rigidities provides a low natural frequency of the moving mass.

17. A speed sensor as claimed in claim 1, characterized in that the dynamic part is suspended from the static part in a reciprocating manner.

18. A speed sensor as claimed in claim 17, characterized in that the dynamic part is connected to the static part by means of a leaf spring.

19. A speed sensor as claimed in claim 18, characterized in that in axial direction the dynamic part is connected in or near the centre to the static part by means of the leaf spring.

20. A speed sensor as claimed in claim 17, characterized in that at least three coils are present between the static part and the dynamic part, the axial shafts of the coils being in essence perpendicular to the axial shafts of the parts and being spread over a circle.

21. A speed sensor as claimed in claim 1, characterized in that the dynamic part is connected to a leaf spring at two spots in essence across from each other, which leaf spring is rigid in a direction parallel with the axial shaft of the dynamic part and slack in a direction perpendicular to the axial shaft and directed towards the axial shaft of the dynamic part.

22. A speed sensor as claimed in claim 21, characterized in that between the static part and the dynamic part at least two coils are present at two spots in essence located across from each other, the axial shafts of these coils being in essence perpendicular to the axial shafts of the parts.

* * * * *